US009823635B2

(12) United States Patent
Thissen

(10) Patent No.: US 9,823,635 B2
(45) Date of Patent: Nov. 21, 2017

(54) HANDHELD INFORMATION PROCESSING DEVICE WITH REMOTE CONTROL OUTPUT MODE

(71) Applicant: HOME CONTROL SINGAPORE PTE. LTD., Toa Payoh (SG)

(72) Inventor: Rogier Louis Jacques Willem Thissen, Heist-op-den-Berg (BE)

(73) Assignee: HOME CONTROL SINGAPORE PTE. LTD., Toa Payoh (SG)

( * ) Notice: Subject to any disclaimer, the term of this patent is extended or adjusted under 35 U.S.C. 154(b) by 245 days.

(21) Appl. No.: 14/428,998

(22) PCT Filed: Sep. 20, 2013

(86) PCT No.: PCT/IB2013/058699
§ 371 (c)(1),
(2) Date: Mar. 18, 2015

(87) PCT Pub. No.: WO2014/045235
PCT Pub. Date: Mar. 27, 2014

(65) Prior Publication Data
US 2015/0234368 A1    Aug. 20, 2015

Related U.S. Application Data

(60) Provisional application No. 61/703,804, filed on Sep. 21, 2012.

(51) Int. Cl.
*G09G 5/00* (2006.01)
*G05B 15/02* (2006.01)
(52) U.S. Cl.
CPC .................................. *G05B 15/02* (2013.01)
(58) Field of Classification Search
CPC ............. G05B 15/02; G06F 2203/0381; G06F 2203/0382; G06F 2203/0384; G06F 3/038; G09G 5/34
See application file for complete search history.

(56) References Cited

U.S. PATENT DOCUMENTS 8,136,053 B1    3/2012 Miller et al.
2009/0153289 A1    6/2009 Hope et al.
(Continued)

FOREIGN PATENT DOCUMENTS

CA        2376936 A1    12/2000
CN      104641403 A     5/2015
(Continued)

OTHER PUBLICATIONS

International Search Report for Int'l Application No. PCT/IB2013/058699, "Handheld Information Processing Device With Remote Control Output Mode," dated Aug. 1, 2014.
(Continued)

*Primary Examiner* — Insa Sadio
(74) *Attorney, Agent, or Firm* — Hamilton, Brook, Smith & Reynolds, P.C.

(57) ABSTRACT

A handheld information processing device such a mobile telephone or portable computer has a normal operating mode in which it executes information processing operations in response to user activation of user controls from the user control interface. Furthermore, the device has a remote control signal transmitter coupled to its processing circuit. The processing circuit is configured to switch automatically to a remote control mode when no user activation of the user controls has been detected for a predetermined time duration. In an embodiment handheld information processing device switches to the remote control mode only if it is within a predetermined range of spatial locations after the time duration. In the remote control mode the processing circuit responds user activation of the user controls substantially only by causing the remote control signal transmitter to transmit conventional remote control command signals to equipment like TVs, recorders etc.

12 Claims, 3 Drawing Sheets

(56) References Cited

U.S. PATENT DOCUMENTS

| | | |
|---|---|---|
| 2010/0333135 A1 | 12/2010 | Lau et al. |
| 2011/0081889 A1 | 4/2011 | Gao et al. |
| 2012/0050310 A1* | 3/2012 | Patel ................. G08C 17/00 345/593 |
| 2012/0105320 A1* | 5/2012 | Yano .................. G06F 3/038 345/157 |
| 2013/0171981 A1 | 7/2013 | Woo |

FOREIGN PATENT DOCUMENTS

| | | |
|---|---|---|
| EP | 2898492 A1 | 7/2015 |
| JP | 2015/529432 A | 10/2015 |
| WO | 0078050 A1 | 12/2000 |
| WO | 2012036475 A2 | 3/2012 |
| WO | WO 2014/045235 A1 | 3/2014 |

OTHER PUBLICATIONS

Written Opinion for Int'l Application No. PCT/IB2013/058699, "Handheld Information Processing Device With Remote Control Output Mode," dated Mar. 21, 2015.

International Preliminary Report on Patentability for Int'l Application No. PCT/IB2013/058699, "Handheld Information Processing Device With Remote Control Output Mode," dated Mar. 24, 2015.

\* cited by examiner

HANDHELD INFORMATION PROCESSING DEVICE WITH REMOTE CONTROL OUTPUT MODE

CROSS-REFERENCE TO PRIOR APPLICATIONS

This application is the U.S. National Phase application under 35 U.S.C. §371 of International Application No. PCT/IB2013/058699, filed on Sep. 20, 2013, which claims the benefit of U.S. Provisional Application No. 61/703,804, filed on Sep. 21, 2012. These applications are hereby incorporated by reference herein.

FIELD OF THE INVENTION

The invention relates to a handheld information processing device that supports switching to an operation mode as a remote control unit and to a method of using an information processing device as a remote control unit.

BACKGROUND

US2010/0333135 discloses use of a wireless handheld device such as a PDA (Personal Digital Assistant) with touch-screen LCD display as a remote control unit. The device may have different operation modes for operating as an interface to applications and an operation mode that involves controlling user equipment with remote control signals. The use of remote control signals is part of operation an interactive media guidance application, wherein the device operates as an electronic program guide. When operating in this mode, a command like a channel change command entered using the touch-screen is automatically sent to the appropriate device.

A wireless handheld device suitable for this purpose because the way in which users interact with many applications on wireless handheld devices is similar to the way in which users interact with an electronic program guide. The interaction assumes that the user switches the device to the task at hand, such as searching for an interesting TV channel and that the user dedicates her or his attention to this task. However, not all use of conventional remote control devices is of this nature. Remote control commands like on/off, reduce/increase sound volume, zapping, pause/play, fast forward etc. are often given casually, without even looking at the remote control device, let alone first switching the device to the task at hand. For such tasks, the device of US2010/0333135 is not convenient.

SUMMARY

Among others, it is an object to simplify casual use of handheld information processing device as a remote control device.

According to one aspect a handheld information processing device is provided, comprising:
 a user control interface;
 a processing circuit coupled to the user control interface, and configured to execute information processing operations in the handheld information processing device in response to user activation of user controls from the user control interface, when in a normal operating mode;
 a remote control signal transmitter coupled to the processing circuit, the processing circuit being configured to switch automatically to a remote control mode when no user activation of the user controls has been detected for a predetermined time duration, the processing circuit being configured to respond user activation of the user controls substantially only by causing the remote control signal transmitter to transmit remote control signals in the remote control mode.

In this way, a mobile telephone, handheld computing device or laptop may automatically become operative as a remote control for remotely controlled devices like television sets, audio systems etc. after a time out period. As a result, the user can casually use the mobile telephone or a handheld computing device as a remote control without first manual switching to the remote control mode. It should be noted that the term "remote control commands" is limited to its conventional meaning in the context of control of remotely controlled devices like television sets, audio systems etc., i.e. using standard predetermined remote control command signals, whereas information processing operations include computations and/or execution of applications and/or network communication operations. The processing circuit responds to the user controls substantially only with remote control commands in the sense that it may also handle commands that explicitly or implicitly cause it to switch from the remote control mode back to the normal operating mode. When the handheld information processing device is a mobile telephone for example, the information processing operations may include processing a telephone call, such as dialing and signal processing during a call in response to user selection of the call. When the handheld information processing device is a computing device the information processing operations may include executing application programs selected by the user.

In an embodiment, the processing circuit is configured to switch automatically to the remote control mode when no user activation of the user controls has been detected for a predetermined time duration only when the a location detector indicates that the device is within a predetermined range of spatial positions. The range of spatial conditions may correspond to a room in the user's home and its immediate environment for example. In this way, it is ensured that the mobile telephone, handheld computing device or laptop will become a remote control only in predetermined environments, like the user's home.

In an embodiment, the device comprises a display screen device with a touch screen coupled to the processing circuit. In this embodiment the user controls may be graphic buttons shown on the display screen. When the device switches to the remote control mode, the processing circuit may cause an indication of the remote control functions associated with different screen areas to be displayed. This signals to the user that and which remote control commands will be executed. In a further embodiment, a back light intensity is reduced or switched off when the device switches to the remote control mode. This saves energy consumption. Alternatively, or in addition, the user controls may be mechanical buttons on the handheld information processing device. Optionally, a display screen may be used to indicate the current remote control functions of such buttons adjacent the buttons.

According to a further aspect a system comprising a remotely controllable device and the handheld information processing device is provided. Herein the remotely controllable device is configured to respond to the remote control command signals from the handheld information processing device in the remote control mode by changing an operating state of the remotely controllable device dependent on the remote control command signal. The remotely controllable device may change it sound volume setting, or its channel selection for example or switch of power or sound in response to the remote control command signal. Within the conventional meaning of remote control commands, the remotely controllable device does so in response to commands that are not individually addressed to it and without necessitating that the commands are from an identifiable remote control device, or that the commands are necessarily preceded by a set up protocol.

BRIEF DESCRIPTION OF THE DRAWING

These and other objects and advantageous aspects will become apparent from a description of exemplary embodiments, using the following figures.

FIG. 4 shows a modified flow chart of operation

DETAILED DESCRIPTION OF EXEMPLARY EMBODIMENTS

Figure 1:
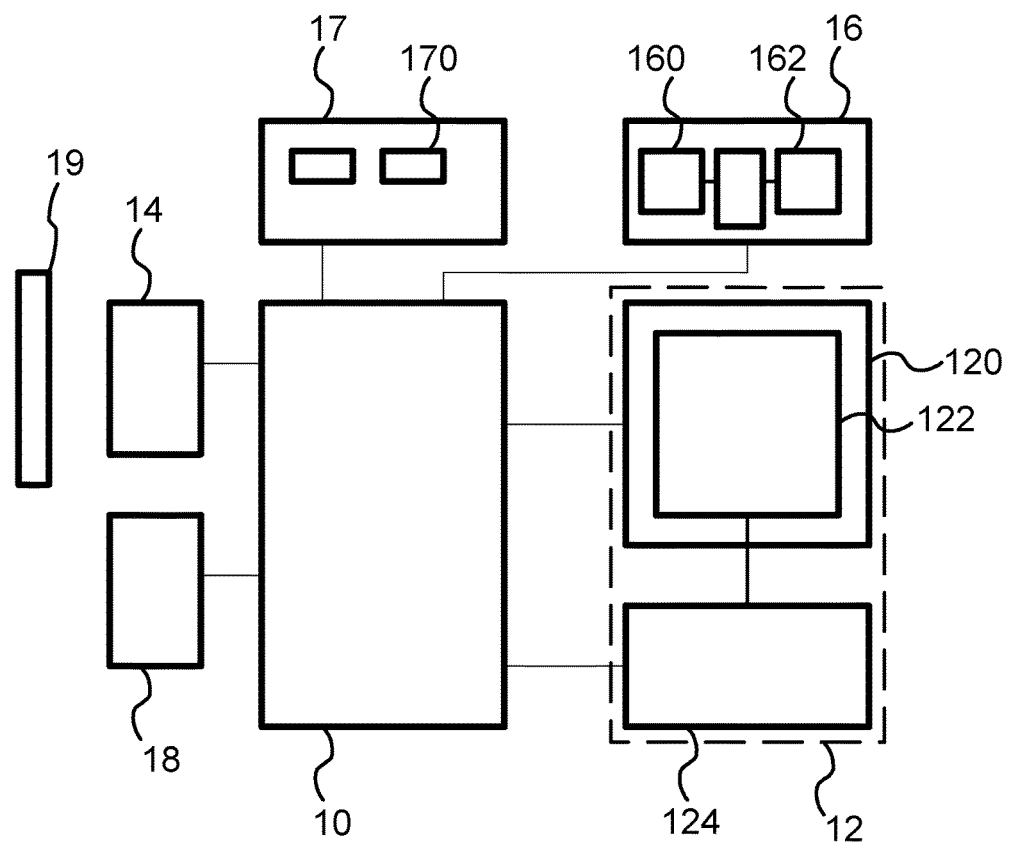
FIG. 1 shows a mobile telephone

FIG. 1 shows a mobile telephone, comprising a processing circuit 10. The mobile telephone is shown as an example of a handheld information processing device. Furthermore the mobile telephone comprises a display unit 12, a remote control signal transmitter 14, a sound interface 16, a control button interface 17, and a wireless network interface 18, all coupled to processing circuit 10. By way of example a remotely controlled device 19 outside the handheld information processing device is also shown. Display unit 12 comprises a display screen 120 coupled to processing circuit 10, a touch screen 122 integrated with display screen 120 and touch screen electronics 124 coupled to touch screen 122 and processing circuit 10. Sound interface 16 comprises a microphone 160 and a speaker 162, sound processing electronics coupled to microphone 160 speaker 162 and processing circuit 10. Control button interface 17 may comprise one or more control buttons 170 or a keyboard if it is included. Although a separate remote control signal transmitter 14 and wireless network interface 18 have been shown, it should be appreciated that wireless network interface 18 may be adapted to transmit remote control commands as well as network messages, if both use the same medium (e.g. RF transmission or IR transmission). In that case no separate units are needed.

Processing circuit 10 provides for a remote control mode as an alternative to the conventional lock screen mode of mobile telephones.

Figure 2:
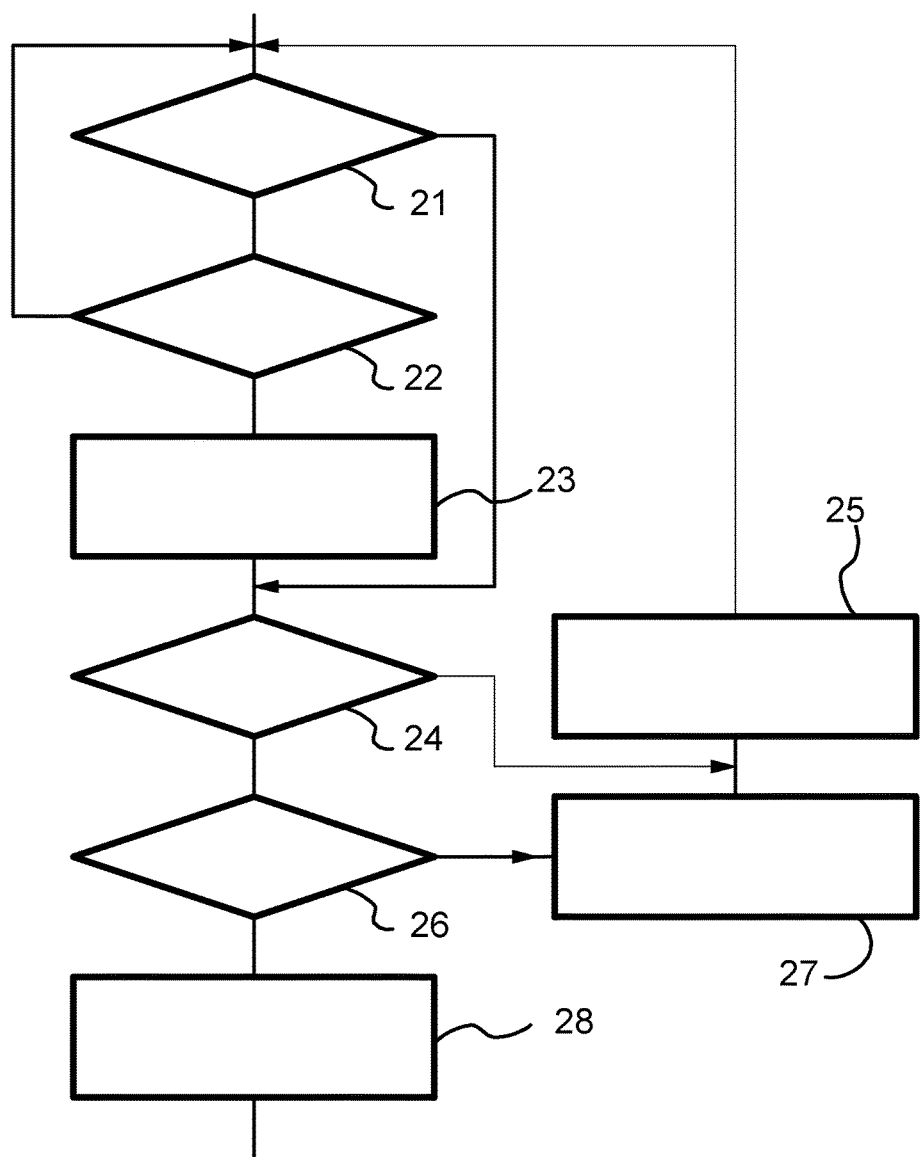
FIG. 2 shows a flow chart of operation

FIG. 2 shows a flow chart of operation of processing circuit 10. A first step 21 and a second step 22 are shown that are involved in switching to a different mode when a time out period has expired. Although an example is given wherein these steps are part of a flow of execution, it should be understood that instead the further steps that follow first step 21 and second step 22 may be started on an interrupt basis, driven by incoming signals and a timer.

In first step 21, processing circuit 10 tests whether the mobile telephone has received a signal that requires execution of an action, for example from the touch screen, control buttons or the wireless network interface. If execution of first step 21 shows that no signal has been received that requires an action, processing circuit 10 executes the second step 22, wherein it tests whether a predetermined duration of time has passed since receiving the last such signal (or since completing the action associated with that signal). If not, processing circuit 10 returns to first step 21.

When second step 22 shows that the duration of time has been exceeded, processing circuit 10 executes a third step 23 wherein it switches the mobile telephone to a remote control mode. If the mobile telephone is already in this mode, no further action is needed. Switching to this mode comprises storing information in a memory of processing circuit 10 representing that the mobile telephone is in this mode. This may further comprise causing display unit 12 to display a predetermined image of a remote control interface screen, for example an image computed by executing a predetermined program. Optionally, switching to the remote control mode may comprise switching off a back light (not shown) of the display, or reducing back light intensity. From third step 23 processing circuit 10 returns to first step 21.

When first step 21 shows than an action is needed, processing circuit 10 proceeds to a fourth step 24, wherein it tests whether the mobile telephone is in the remote control mode, based on the stored information that represents the mode. If not, processing circuit 10 proceeds to a fifth step 25, wherein it performs the action associated with the received signal. From fifth step 25 processing circuit 10 returns to first step 21.

If fourth step 24 shows that the mobile telephone is in the remote control mode, processing circuit 10 proceeds to a sixth step 26, wherein it tests whether the received signal requires switching from the remote control mode. If so, processing circuit 10 executes a seventh step 27, wherein it switches the mobile telephone from the remote control mode. This may comprise storing information in a memory of processing circuit 10 representing that the mobile telephone is not in this mode. As may be noted, only a limited set of special commands may require switching from the remote control mode, for example only commands that are conventionally used to switch from a lock screen mode may be used for this. From seventh step 27 processing circuit 10 may proceed to first step 21 optionally via fifth step 25. If sixth step 26 shows that no switch from the remote control mode is needed, processing circuit 10 proceeds to an eight step 28.

In eight step 28 processing circuit 10 tests whether the received signal is of a type associated with a remote control command. If so, processing circuit 10 causes remote control signal transmitter 14 to transmit that a remote control signal corresponding to the command. As is known per se transmission of a remote control signal may constitute the entire response to a command entered on the touch screen or a button, no reception of return signals from the remotely controlled device being performed. In the case of some commands, such as a volume up command, repeated remote control signals may be transmitted while it is detected that the user continues to select the command on the touch screen or the button. In the case of other commands, a single remote control signal may be transmitted even if the user continues to select the command on the touch screen or the button. From eight step 28 processing circuit 10 returns to first step 21. It should be noted that after eight step 28 the mobile telephone remains in the remote control mode. Furthermore, it may be noted that some signals as a result of user input may correspond neither to a remote control command nor to a command to switch from the remote control mode. Although such signals may cause processing circuit 10 to execute actions when in the normal operating mode, eight step 28 provides for executing no response to signals that do not represent remote control commands.

In a further embodiment, the device provides for a selection of a set of remote control commands that will be available in the remote control mode. For example, a set of commands for a television set, or a set of commands for an audio system may be selected. In this embodiment, in eight step 28 processing circuit 10 retrieves information representing a currently selected set of remote control commands and their association with user controls. Processing circuit 10 determines the remote control command from the current set associated with the received signal, and causes that remote control command to be transmitted.

Processing circuit 10 may be configured, when in the normal operating mode, to execute commands to select the set of remote control commands that will be used in the remote control mode.

As used herein, a "remote control command signal" is a standard stand alone, one way command signal. Remote control command signals are signals that may be transmitted directly to any remotely controlled device within reception range via a wireless medium. The remote control command signal is the same each time a user control to send the signal is activated. Such a standard command signal does not address a specific remotely controlled device (other than by at most its type) nor does it have an identification of the individual transmitting device.

Thus, for example, a remote control command signal for a television set of a specific type will be executed by any television set of that specific type, whenever such a television set is within reception range. Similarly, a remote control command signal from any transmitting device will be executed, irrespective of the identification (e.g. network address) of the individual transmitting device. Remote control command signals are stand alone, one way command signals in the sense that the remotely controlled commands will each be executed without necessity of any transmission from the remotely controlled device back via the wireless medium.

Hence the processing circuit 10 receives no information about whether the remote control command has been executed, and need not maintain such information or information about transmitted commands in the remote control mode. Processing circuit 10 keeps no record of remotely controlled devices that are within reception range. Indeed the command may not have been executed if no active remotely controlled device is in reception range. Hence information processing in relation to the remote control commands is not used in the remote control mode: in this mode the commands are simply transmitted in the same way every time when the user activates a corresponding user control.

Processing circuit 20 may provided with a computer program for making it execute the steps of the flow-chart. As will be appreciated, execution of these steps has the effect that the mobile telephone will switch to the remote control mode when it is not used for a predetermined time. In this mode the mobile telephone responds to a predetermined set of user inputs by transmitting remote control commands to an external remotely controlled device 19 outside the mobile telephone, without switching the mobile telephone from the remote control mode. Furthermore, special commands to switch from the mobile telephone the remote control mode are executed, but other commands of the mobile telephone are not executed, unless the mobile telephone is first switched from the remote control mode.

In other words, when the mobile telephone detects that it has not been used for a predetermined time, it switches to a mode wherein it stops executing user commands that result in internal status changes, other than special commands to leave this mode, but wherein the mobile telephone executes commands that are capable of affecting an external remote controlled device 19.

Although an example has been described for a mobile telephone, it should be appreciated that the flow chart can also be implemented by other handheld information processing devices, such as PDAs (personal digital assistants), laptop or palmtop computers, tablet computers etc.

Figure 3:
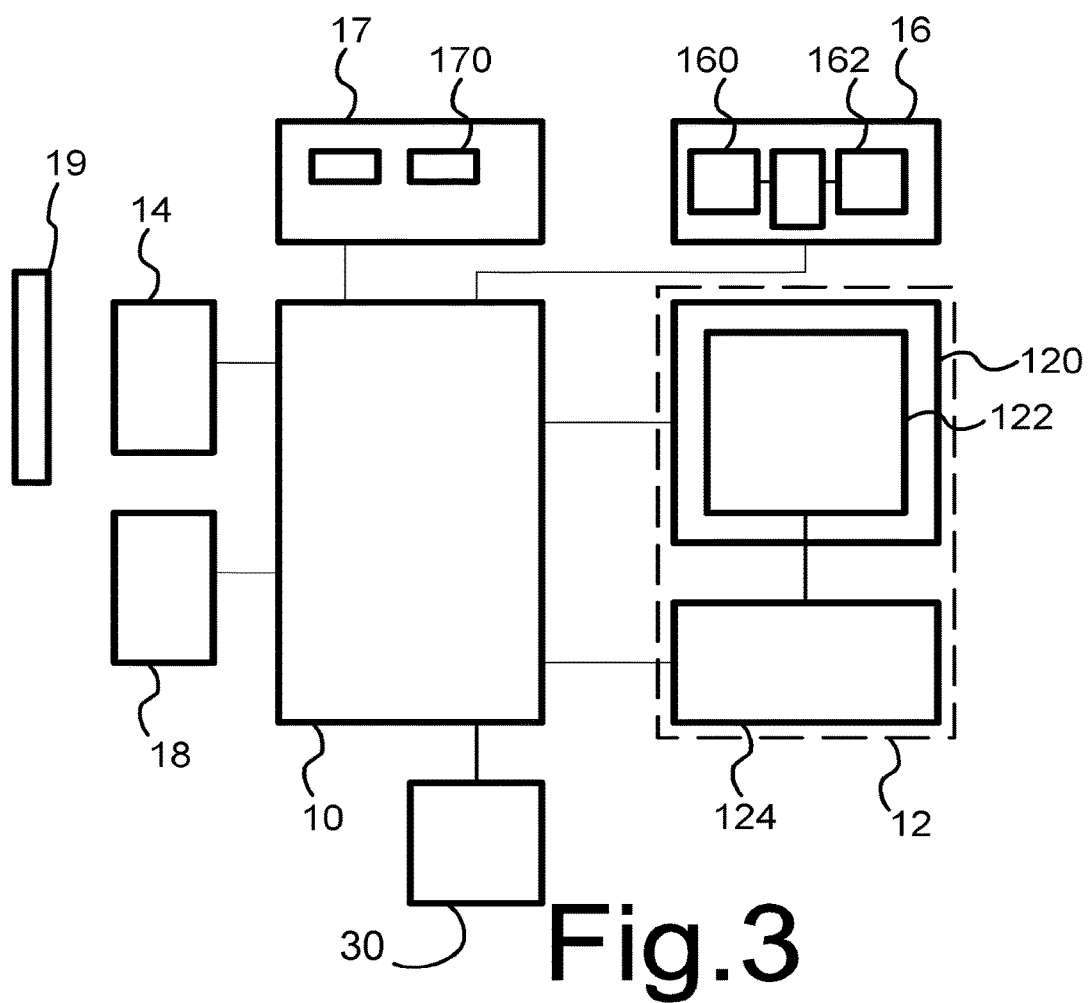
FIG. 3 shows a handheld information processing device

FIG. 3 shows an embodiment wherein the handheld information processing device comprises a location detector 30 coupled to processing circuit 10. Location detector 30 is used to enable the information processing device to select between switching to the remote control mode or to a lock screen mode dependent on the location detected by location detector 30. Thus, the device may be switched to the remote control node when location detector 30 indicates that it is in or near the user's home and to the lock screen mode if not. Location detector 30 may comprise a GPS (Global Positioning System) receiver for example, but other types of location detector 30 may be used, such as location detector 30 that uses detection of signals from a beacon transmitter (e.g. a base station) to detect proximity to the beacon transmitter.

In an embodiment, the remotely controllable device 19 may be used as beacon transmitter. In this embodiment, remotely controllable device 19 is configured to transmit beacon signals, optionally containing an identification of remotely controllable device 19 or the handheld information processing device. In this embodiment, handheld information processing device may be programmed to perform location detection only in response to beacon signals that contain an identification of the remotely controllable device 19. Alternatively, remotely controllable device 19 may comprise a programmable circuit, wherein an address of the handheld information processing device may be programmed and remotely controllable device 19 may be configured to transmit that address in the beacon signals.

FIG. 4 shows a flow chart of operation of the device of FIG. 3. Steps that are similar to those of FIG. 2 are indicated by the reference numbers from FIG. 2. The flow chart of FIG. 4 has a first additional step 41, which is executed when second step 22 shows that the duration of time has been exceeded. In first additional step 41, processing circuit 10 tests whether location detector 30 is within a predetermined range of locations, for example by comparing coordinates of a detected location are within predetermined bounds, or whether a distance to a predetermined reference location is below a predetermined threshold.

If first additional step 41 indicates that the device is within the predetermined range of locations, processing circuit 10 proceeds to third step 23 as before. If not, processing circuit 10 proceeds to a second additional step 42 wherein processing circuit 10 stores information that the device is in a lock screen mode distinct from the remote control mode. From second additional step 42 processing circuit 10 proceeds to first step 21.

In a third additional step 43 executed before fourth step 24, processing circuit 10 tests whether the device is in the lock screen mode. If not, processing circuit 10 proceeds to fourth step 24. If the device is found to be in the locked screen mode, processing circuit 10 executes a fourth additional step 44, wherein it switches from the locked screen mode only if the received signal indicates a special command to do so. From fourth additional step 44 processing circuit 10 proceeds to first step 21.

As will be appreciated, the flow chart of FIG. 4 has the effect that the information processing device selects between switching to the remote control mode or to a lock screen mode dependent on whether location detector 30 indicates whether the device is within a predetermined range of locations.

Although examples have been shown wherein the switch to the remote control mode is performed automatically after a time out period, optionally dependent on the detected location of the device, it should be appreciated that in addition manually controllable switching may be provided for. For this purpose, processing circuit 10 may be configured to respond to reception of a predetermined command by switching to the remote control mode.

Although flow charts of operation have been shown by way of example, it should be appreciated that a similar operation may be achieved in other ways. For example, instead of using a single flow (execution thread) a plurality of parallel processes may be used (multiple threads), including a process to modify the mode setting, one or more processes to respond to user input and/or a user interface display process. Furthermore, other processes may run in parallel for handling network communication etc. A single flow may be executed by a programmable processor under control of a single computer program. Alternatively, a plurality of programs may be used for different ones of the processes.

Part or all of the functions of the processes may be performed by means of dedicated electronic circuits instead of program instructions, for example a timer circuit may be used coupled to a circuit that stores an indication of the mode, processing circuit 10 being configured to reset the timer circuit each time when it receives a command and the timer circuit being configured to set an indication of the remote control mode when a predetermined time duration has expired after a last previous reset. Processing circuit 10 may be realized using a single computer, for example with a single processing unit (CPU), a program memory and a data memory, or by means of a plurality of processors, part or all of the processes being executed by different processors.

Although an embodiment with a touch screen has been described, it should be appreciated that the same technique may be used if only mechanical control buttons are used, the control buttons normally functioning to control processing commands, like selection of a telephone number or menu selection, the control buttons becoming buttons to control transmission of remote control commands in the remote control mode.

Although an embodiment with a display has been described, which has the advantage that the current commands corresponding to buttons and/or touch screen locations can be displayed, it should be appreciated that alternatively the display may be omitted. In this case, lettering on or near the buttons and/or touch screen locations may be used to indicate the command of the different modes. A light source or other signaling device may be used to indicate the mode in such an embodiment.

In an embodiment the device is configured to transmit no remote control commands when not in the remote control mode, user controls that are used for triggering remote control signals in the remote control mode being used for a different purpose when not in the remote control mode, or user controls being made available for remote control at least being disabled by the device when not in the remote control mode. In another embodiment the device may be configured to transmit remote control commands also when not in the remote control mode, user controls being provided for this when not in the remote control mode as well. In this case, the device is configured not to make user commands that are not remote control commands available when in the remote control mode, except for special commands to leave the remote control mode, or to disable user commands that are not remote control commands.

Although an embodiment has been described wherein the device always automatically switches to the remote control mode after a time out period, at least when it is detected to be within a predetermined range of locations, it should be appreciated that alternatively the device may provide for manual enabling and disabling of such switching. In an embodiment, processing circuit 10 is configured to record whether switching to the remote control mode is enabled or disabled, the command being executed in response to a user input. In this embodiment processing circuit 10 is configured to test whether automatic switching to the remote control mode is enabled or disabled before executing the automatic switch, if it is enabled. When automatic switching is disabled the device may switch to a lock-screen mode, a sleep mode or switch off power instead.

Although examples have been given with a single normal operating mode, it should be understood that the normal operating mode may in fact comprise a plurality of different operating modes to which the device can be switched.

Although in one embodiment only one set of remote control commands may be supported, which are always used when the device switches to the remote control mode, as noted other embodiments may provide for user selection of this set. Processing circuit 10 may be configured, when in the normal operating mode, to execute commands to select the set of remote control commands that will be used in the remote control mode. Selectable sets of remote control commands may include respective sets for different remotely controlled devices (e.g. a TV, an audio system, a recorder etc.), different subsets of remote control commands for such devices (e.g. a set with zap and volume commands for a TV, or a set with teletext commands), or a set with commands for a combination of remotely controlled devices (e.g. sound volume for a TV and channel selection for a settop box). Processing circuit 10 may be configured to cause the display to indicate the commands from the previously selected set when switching to the remote control mode.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A handheld information processing device, comprising:
   a user control interface;
   a processing circuit coupled to the user control interface, the processing circuit configured to execute information processing operations in the handheld information processing device in response to user activation of user controls from the user control interface, when in a normal operating mode; and a remote control signal transmitter coupled to the processing circuit, the processing circuit being configured to switch automatically to a remote control mode based on an interrupt and a timer such that the processing circuit automatically switches to the remote control mode when no user activation of the user controls has been detected for a predetermined time duration, the user controls being associated with predefined remote control command signals in the remote control mode, the processing circuit being configured to respond to user activation of the user controls in the remote control mode by causing the remote control signal transmitter to transmit the predefined remote control command signals associated with the user controls.

2. A device according to claim 1, comprising a location detector coupled to the processing circuit, the processing circuit being configured to switch automatically to the remote control mode when no user activation of the user controls has been detected for a predetermined time duration and in response to beacon signals received by the remote control signal transmitter when the location detector indicates that the device is within a predetermined range of spatial positions by comparing coordinates of a detected location of the handheld information processing device within predetermined bounds.

3. A device according to claim 1, wherein the processing circuit is configured to receive an indication of a selection of a set of remote control commands in the normal operating mode, and to associate the remote control command signals with the user controls based on said indication in the remote control mode.

4. A device according to claim 1, wherein the device is a mobile telephone, the information processing operations comprising exchanging messages over a mobile communication network.

5. A device according to claim 1, wherein the device is a portable computing device, the information processing operations comprising performing computations and/or executing application programs responsive to the user controls.

6. A device according to claim 1, comprising a display screen device comprising a touch screen coupled to the processing circuit, the user controls comprising surface parts of the touch screen with redefinable functions, the processing circuit being configured to cause an indication of the remote control functions associated with different screen areas to be displayed on the display screen device in the remote control mode.

7. A device according to claim 6, wherein the processing circuit is configured to reduce and switch off back lighting in the display screen device when switching to the remote control mode.

8. A system comprising a remotely controllable device and a handheld information processing device according to claim 1, wherein the remotely controllable device is configured to respond to the remote control command signals by changing an operating state of the remotely controllable device dependent on the remote control command signal.

9. A device according to claim 1, wherein the processing circuit is further configured to switch automatically to the remote control mode based on a timeout period, the timeout period being dependent on a detected location of the handheld information processing device.

10. A method of operating a handheld information processing device, the method comprising:
automatically switching the handheld information processing device from a normal operating mode to a remote control mode, the automatically switching being based on an interrupt and a timer, when no user activation of user controls from a user control interface of the device has been detected for a predetermined time duration;
executing information processing operations in the handheld information processing device in response to user activation of the user controls when in the normal operating mode, substantially transmitting remote control command signals in response to user activation of the user controls in the remote control mode.

11. A method according to claim 10, comprising
detecting whether the handheld information processing device is within a predetermined range of spatial positions;
executing said automatic switching to the remote control mode when the device is detected to be within the predetermined range of spatial positions.

12. A non-transitory computer program product, comprising a program of instructions for a programmable processor that, when executed by the programmable processor causes the programmable processor to:
execute information processing operations in response to user activation of user controls from a user control interface when in a normal operating mode; and
based on an interrupt and a timer, switch automatically to a remote control mode when no user activation of the user controls has been detected for a predetermined time duration, the user controls being associated with predefined remote control command signals in the remote control mode, a processing circuit being configured to respond to user activation of the user controls in the remote control mode by causing a remote control signal transmitter to transmit the predefined remote control command signals associated with the user controls.

* * * * *